United States Patent
Toksvig et al.

(10) Patent No.: US 8,068,118 B1
(45) Date of Patent: *Nov. 29, 2011

(54) SYSTEM AND METHOD FOR MODIFYING A NUMBER OF TEXTURE SAMPLES FOR ANISOTROPIC TEXTURE FILTERING

(75) Inventors: Michael J. M. Toksvig, Palo Alto, CA (US); William P. Newhall, Jr., San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 12/114,662

(22) Filed: May 2, 2008

Related U.S. Application Data

(63) Continuation of application No. 11/247,099, filed on Oct. 11, 2005, now Pat. No. 7,372,467.

(51) Int. Cl.
*G09G 5/00* (2006.01)
(52) U.S. Cl. .................. 345/582; 345/587; 345/611
(58) Field of Classification Search .................. None
See application file for complete search history.

(56) References Cited

U.S. PATENT DOCUMENTS

| | | | |
|---|---|---|---|
| 6,104,415 A * | 8/2000 | Gossett | 345/552 |
| 6,292,193 B1 * | 9/2001 | Perry et al. | 345/582 |
| 6,724,395 B1 | 4/2004 | Treichler | |
| 7,071,937 B1 | 7/2006 | Collodi | |
| 7,221,371 B2 | 5/2007 | Donovan et al. | |
| 7,271,810 B1 | 9/2007 | Newhall et al. | |
| 7,339,594 B1 | 3/2008 | Newhall et al. | |

OTHER PUBLICATIONS

McCormack, Joe, et al., "Feline: Fast Elliptical Lines for Anisotropic Texture Mapping," Mitsubishi Electric Information Technology Center America, 2000, p. 9.*

* cited by examiner

*Primary Examiner* — Kee M Tung
*Assistant Examiner* — Jwalant Amin
(74) *Attorney, Agent, or Firm* — Patterson & Sheridan, LLP

(57) ABSTRACT

Systems and methods for modifying the number of texture samples used to produce an anisotropically filtered texture mapped pixel may improve texture mapping performance. When the number of texture samples is reduced, fewer texels are read and fewer filtering computations are needed to produce a texture value for an anisotropic footprint. The number of texture samples is reduced based on the mip map level weight. The number of texture samples may also be modified using specific parameters for the coarse and/or fine mip map levels. The spacing between the texture samples along the major axis of anisotropy may be modified to improve image quality or texture cache performance.

20 Claims, 15 Drawing Sheets

PRIOR ART

SYSTEM AND METHOD FOR MODIFYING A NUMBER OF TEXTURE SAMPLES FOR ANISOTROPIC TEXTURE FILTERING

CROSS-REFERENCE TO RELATED APPLICATIONS

This application is a continuation of co-pending U.S. patent application titled, "A SYSTEM AND METHOD FOR MODIFYING A NUMBER OF TEXTURE SAMPLES FOR ANISOTROPIC TEXTURE FILTERING," filed Oct. 11, 2005, and having Ser. No. 11/247,099. The subject matter of the aforementioned non-provisional patent application is hereby incorporated by reference.

BACKGROUND OF THE INVENTION

1. Field of the Invention

Embodiments of the present invention generally relate to computer graphics, and more particularly to anisotropic filtering of texture data.

2. Description of the Related Art

Conventional graphics processors are exemplified by systems and methods developed to read and filter texture map samples. To simplify the texture map filtering performed within a graphics processor, a texture is prefiltered and various resolutions forming an image pyramid or "mipmap" are stored. FIG. 1A is a conceptual diagram of prior art showing the levels of a mipmapped texture including the finest level, level 101, and successively lower resolution levels, 102, 103, and 104. In some systems, mipmap levels are numbered such that level 0 is the highest resolution, "base" level, and level k is half the size in each dimension of level k−1, for all k up to the apex of the pyramid.

The region in texture space corresponding to a pixel is called the pixel's "footprint". A pixel can be approximated with a circle in screen space. For texture mapping of two-dimensional textures, the corresponding footprint in texture space can be approximated by an ellipse. In classic use of mipmaps, a mipmap level is chosen so that the footprint when scaled to that level is about 1 texel (texture pixel) in diameter. Then a bilinear filter is used to interpolate between the values of four texels forming a 2×2 square around the footprint center, to produce a bilinear texture sample. This is called isotropic filtering, because it filters equally in the two texture space dimensions, u and v. Although the filter yielding excellent image quality, the ideal filter, has an approximately elliptical shape, isotropic filtering approximates the ellipse with a circle, to simplify the texture sampling and filtering computations. Therefore, portions of the footprint are not sampled, resulting in visual artifacts caused by undersampling.

In FIG. 1A, a footprint 115 is a pixel footprint in texture space, with a position 135 being the footprint center. FIG. 1B illustrates a prior art application of texture level 101 applied to pixels of a surface 140 that is receding in image space. When viewed in image space, footprint 115 (an ellipse) appears as circle 116. All ellipses have a largest diameter, called the major axis, and a smallest diameter, called the minor axis. Isotropic filtering yields high quality images for pixels whose footprints have major and minor texture axes that are similar in length. But texture stretching, oblique viewing, and perspective can cause footprints to be very elongated, such as footprint 115. When isotropic filtering is used in such situations, a circle is not a good approximation of an ellipse. If the circle is too small (diameter close to the minor axis), the filter is too sharp, too few texels are averaged, and aliasing results. If the circle is too large (diameter close to the major axis), the filter is too broad, too many texels are averaged, and blurring results. Anisotropic texture filtering addresses this problem by using a filter that more closely matches the elliptical shape of the ideal filter.

FIG. 1C illustrates footprint 115 including a minor axis 125 that is significantly shorter than a major axis 130. Texture samples along major axis 130, the axis of anisotropy, are read from one or more mipmap levels and are blended to produce a pixel color. The level from which the samples are read is determined using a level of detail (LOD) value which is nominally the log base 2 of the length of minor axis 125. The number of texture samples read from the texture map is determined based on the ratio of the major axis to the minor axis, the anisotropic ratio, with more texture samples needed as the ratio increases, i.e. as the ellipse becomes more elongated.

When the LOD value lies between two integers, texture samples from two different LOD mip maps, a coarse and a fine mip map, are used to produce an anisotropically filtered texture value for the footprint. The coarse mip map has a lower resolution compared with the fine mip map. Increasing the LOD value effectively increases the diameter of each bilinear texture sample since texels are read from a lower resolution mipmap. Bilinear samples from the two LODs are combined based on the fractional portion of the LOD to produce an anisotropically filtered texture sample corresponding to pixel 116.

FIG. 1D illustrates a prior art application of ten bilinear samples, bilinear samples 140, that are positioned along major axis 130 to approximate an elliptical footprint for a coarse LOD mip map, such as footprint 115. Each bilinear sample corresponds to an isotropically filtered texture sample for an LOD of a texture map that is computed using conventional bilinear isotropic filtering. Each bilinear sample of bilinear samples 140 is spaced less than one texel apart. In some conventional systems, the bilinear samples in the coarse LOD are spaced by 0.5 to 1.0 texels apart. Therefore the coarse LOD mip map is oversampled, possibly introducing visual artifacts and requiring more computations and texel reads than if the spacing were one texel apart.

FIG. 1E illustrates a prior art application of bilinear samples, bilinear samples 150, that are positioned along major axis 130 to approximate an elliptical footprint for a fine LOD mip map, such as footprint 115. Each bilinear sample of bilinear samples 140 is spaced more than one texel apart. Therefore the fine LOD mip map is undersampled. The undersampling resulting from a spacing between one and two texels is generally considered to produce images of acceptable quality. Therefore, unlike the coarse LOD, fewer texel reads and computations are used to produce a filtered texture value for the fine LOD.

Accordingly, there is a desire to improve texture mapping performance by reducing the number of bilinear texture samples used to perform anisotropic texture mapping. Reducing the number of samples while maintaining an acceptable level of image quality may result in performance improvements due to fewer texel reads and filtering computations.

SUMMARY OF THE INVENTION

The current invention involves new systems and methods for determining the number and spacing of texture samples to use to produce an anisotropically filtered texture mapped pixel. Reducing the number of texture samples used to produce an anisotropically filtered texture mapped pixel may improve texture mapping performance since fewer texels will be read from a texture map and processed. The number of texture samples is reduced based on the mip map level weight.

The number of texture samples may be further modified using specific parameters for the coarse and/or fine mip map levels. The spacing between the texture samples along the major axis of anisotropy may also be modified.

Various embodiments of the invention include a texture unit for performing anisotropic texture mapping to produce filtered texture values. The texture unit includes a sample modification unit, a sample spacing unit, and a filter unit. The sample modification unit is configured to compute a spread equal or less than one texel for a number of texture samples based on a mip map level weight and compute a modified number of texture samples for a level of detail of a mip mapped texture using the spread. The sample spacing unit is configured to position the modified number of texture samples along a major axis of anisotropy according to the spread. The filter unit is configured to filter the modified number of texture samples to produce a filtered texture value for an anisotropic footprint.

Various embodiments of a method of the invention for modifying a number of texture samples for a level of detail of a mip mapped texture that are used to produce an anisotropically filtered texture value for a footprint include computing a spread based on a spread function that specifies a spacing of at least one texel for a number of texture samples for the level of detail of the mip mapped texture and computing a modified number of texture samples for the level of detail of the mip mapped texture by dividing a length of a major axis of the footprint by the spread.

Various embodiments of the invention include a programmable graphics processor for generating images using anisotropically filtered texture values.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The major and minor axes of anisotropy define a footprint that represents the projection of the pixel onto the texture map. Texture samples are positioned along the axis of anisotropy (the major axis) to approximate the footprint. The number of texture samples determines the number of texture samples which are read from an LOD of a mip mapped texture map and filtered to produce an anisotropically filtered texture value. When the LOD is not an integer value, texture samples are used from two different LOD mip maps and the number of texture samples read from at least one of the LOD mip maps may be reduced to improve performance of anisotropic texture mapping. Spacing of the texture samples along the major axis may also be modified to improve the image quality or improve the texture cache hit rate when a modified number of texture samples are used.

The target level of detail, LODt, is base-two log of the length of the minor axis of a footprint. Other techniques known to those skilled in the art may be used to compute an LOD. Generally, when performing anisotropic filtering with trilinear interpolation between mipmap levels for each isotropic tap, the two LODs should be calculated as follows. The fine texture map LOD, LODfine, is set to the integer portion of LODt, and the coarse level LOD, LODcoarse, is set to LODfine+1. Interpolation between the two levels is performed according to the fractional part of LODt, LODfrac. LODfrac is a mip map level weight for the coarse LOD and 1−LODfrac is a mip map level weight for the fine LOD. When performing trilinear interpolation for an anisotropic footprint, the bilinear texture samples for the fine LOD mip map are combined to produce a fine LOD texture value and the bilinear texture samples for the coarse LOD mip map are combined to produce a coarse LOD texture value. The fine LOD texture value and the coarse LOD texture value are then interpolated according to the fractional part of LODfrac to produce a trilinearly filtered texture value for the anisotropic footprint.

Figure 2A:
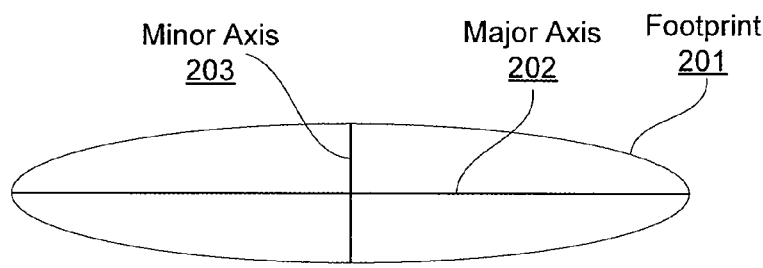
FIG. 2A illustrates an anisotropic footprint in accordance with one or more aspects of the present invention.
Figure 2B:
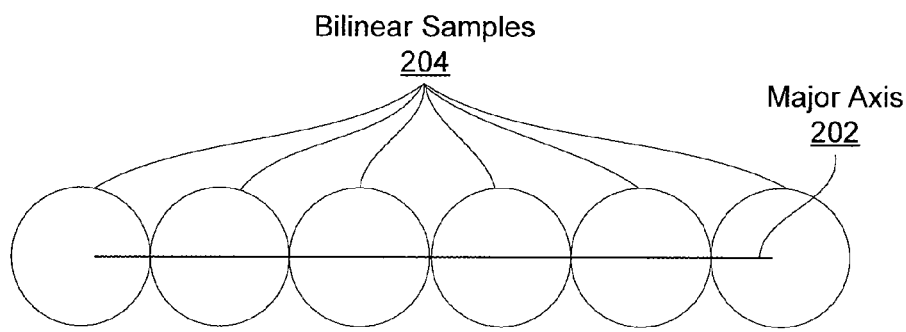
FIG. 2B illustrates a number of bilinear samples spread along the major axis to approximate the elliptical footprint of FIG. 2A for a coarse LOD mip map in accordance with one or more aspects of the present invention.
Figure 2C:
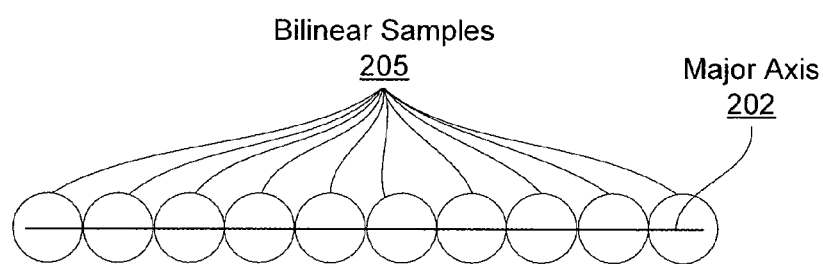
FIG. 2C illustrates a number of bilinear samples spread along a major axis to approximate an elliptical footprint of FIG. 2A for a fine LOD mip map in accordance with one or more aspects of the present invention.

FIG. 2A illustrates an anisotropic footprint, footprint 201, in accordance with one or more aspects of the present invention. Footprint 201 has a major axis, major axis 202 of length 8.75 and a minor axis, minor axis 203, of length 1.75. The anisotropic ratio is 5 and the LOD computed as log base 2 of minor axis 203 is 0.807. LODfrac is also 0.807. Ideally, the texture samples used to produce an anisotropically filtered texture value for footprint 201 are from a mip map for a LOD of 0.807. Unfortunately, texture mapping systems typically only include prefiltered LOD mip maps for integer values. However, good filtering results may be achieved by using texture samples that are spaced by one texel for both the coarse and fine LOD mip maps, as shown in FIGS. 2B and 2C, respectively, to approximate an LOD mip map of 0.807. Spacing the bilinear texture samples by one texel produces a filtered texture value without over or under sampling, minimizing undesirable visual artifacts. Methods described in conjunction with FIGS. 3A, 5A, and 5D may be used to space the texture samples by one texel to produce a filtered texture value.

Figure 1A:
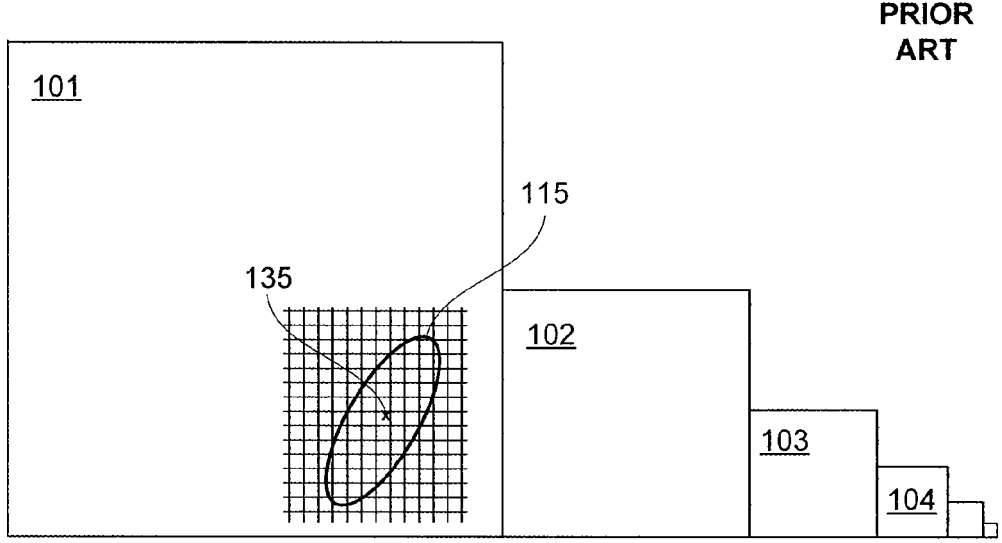
FIG. 1A is a conceptual diagram of prior art showing a mipmapped texture.
Figure 1B:
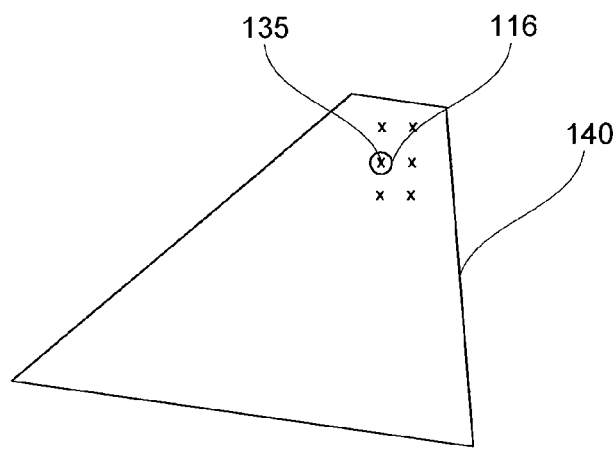
FIGS. 1B and 1C illustrate a prior art application of texture samples to a surface.
Figure 1C:
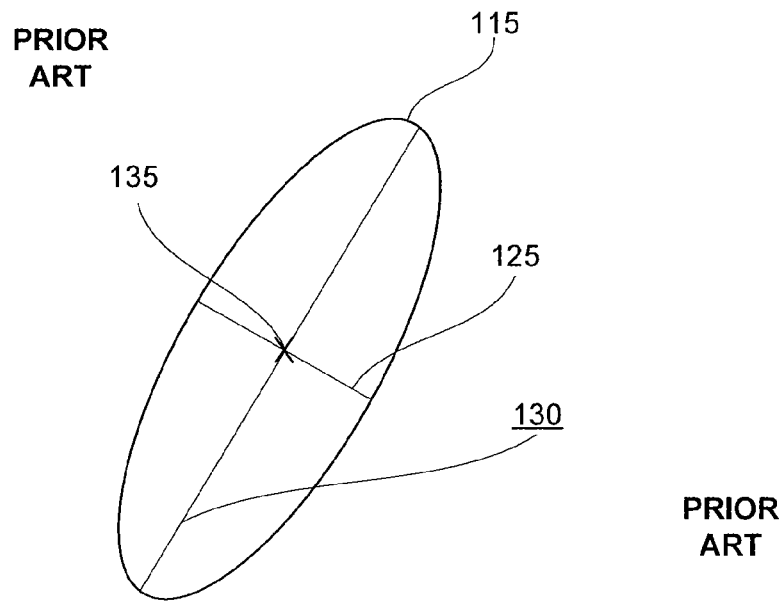
Figure 1D:
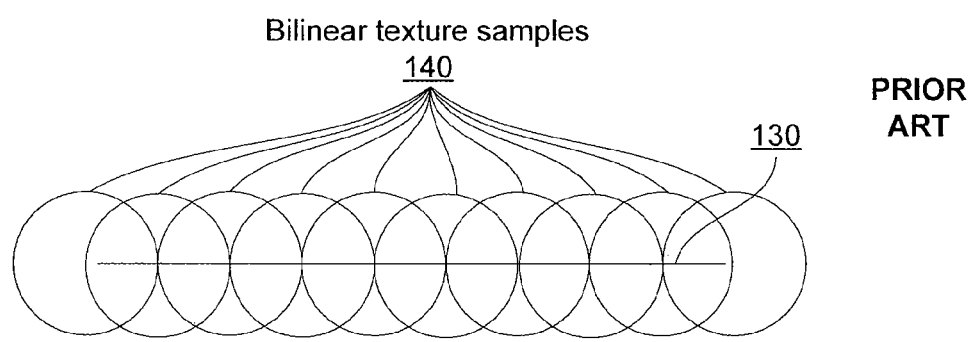
FIG. 1D illustrates a prior art application of bilinear samples that are positioned along a major axis to approximate an elliptical footprint for a coarse LOD mip map.

FIG. 2B illustrates a number of bilinear samples spread along major axis 202 to approximate elliptical footprint 201 of FIG. 2A for a coarse LOD mip map in accordance with one or more aspects of the present invention. Specifically six bilinear samples, bilinear samples 204 are spaced by one texel along major axis 202 to cover major axis 202. In comparison with FIG. 1D, in which ten bilinear samples are used from the coarse LOD mip map, the number of bilinear texture samples is reduced. Although the texture samples, bilinear samples 204, are labeled as bilinear texture samples, in other embodiments of the present invention texture samples may be used that are produced using other reconstruction filtering techniques known to those skilled in the art.

The length of major axis 202 in the coarse LOD mip map is 4.375, so 4.375 bilinear texture samples of bilinear samples 204 cover major axis 202. Bilinear samples 204 may be filtered to produce a filtered texture value for the coarse LOD mip map. The filtered texture value for the coarse LOD mip map is then weighed by the coarse mip map level weight (LODfrac) and combined with a filtered texture value for the fine LOD mip map to produce the filtered texture for footprint 201.

FIG. 2C illustrates a number of bilinear samples spread along major axis 202 to approximate elliptical footprint 201 of FIG. 2A for a fine LOD mip map in accordance with one or more aspects of the present invention. Specifically ten bilinear samples, bilinear samples 205 are spaced by one texel along major axis 202 to cover major axis 202. The length of major axis 202 in the fine LOD mip map is 8.750, so 8.750 bilinear texture samples of bilinear samples 205 cover major axis 202. Bilinear samples 205 may be filtered to produce a filtered texture value for the fine LOD mip map. The filtered texture value for the fine LOD mip map is then weighed by the fine mip map level weight (1−LODfrac) and combined with the filtered texture value for the coarse LOD mip map to produce the filtered texture for footprint 201.

To improve texture filtering performance, fewer bilinear texture samples may be used to produce filtered texture values for the fine LOD mip map and for the coarse LOD mip map. However, it may not be desirable to reduce the number of bilinear texture samples so much that visual artifacts are perceptible. In particular, it is preferable to reduce the number of bilinear samples used from the LOD (coarse or fine) that will be weighed less. For example, the larger the LODfrac is, the greater the mip map level weight is for the coarse LOD mip map. Therefore, errors in bilinear texture sample filtering caused by a reduced number of bilinear texture samples in the fine LOD mip map may be less visible. FIG. 3 illustrates an embodiment of a method for reducing the number of bilinear texture samples used to perform anisotropic filtering based on the mip map weight for a LOD in accordance with one or more aspects of the present invention.

Figure 3A:
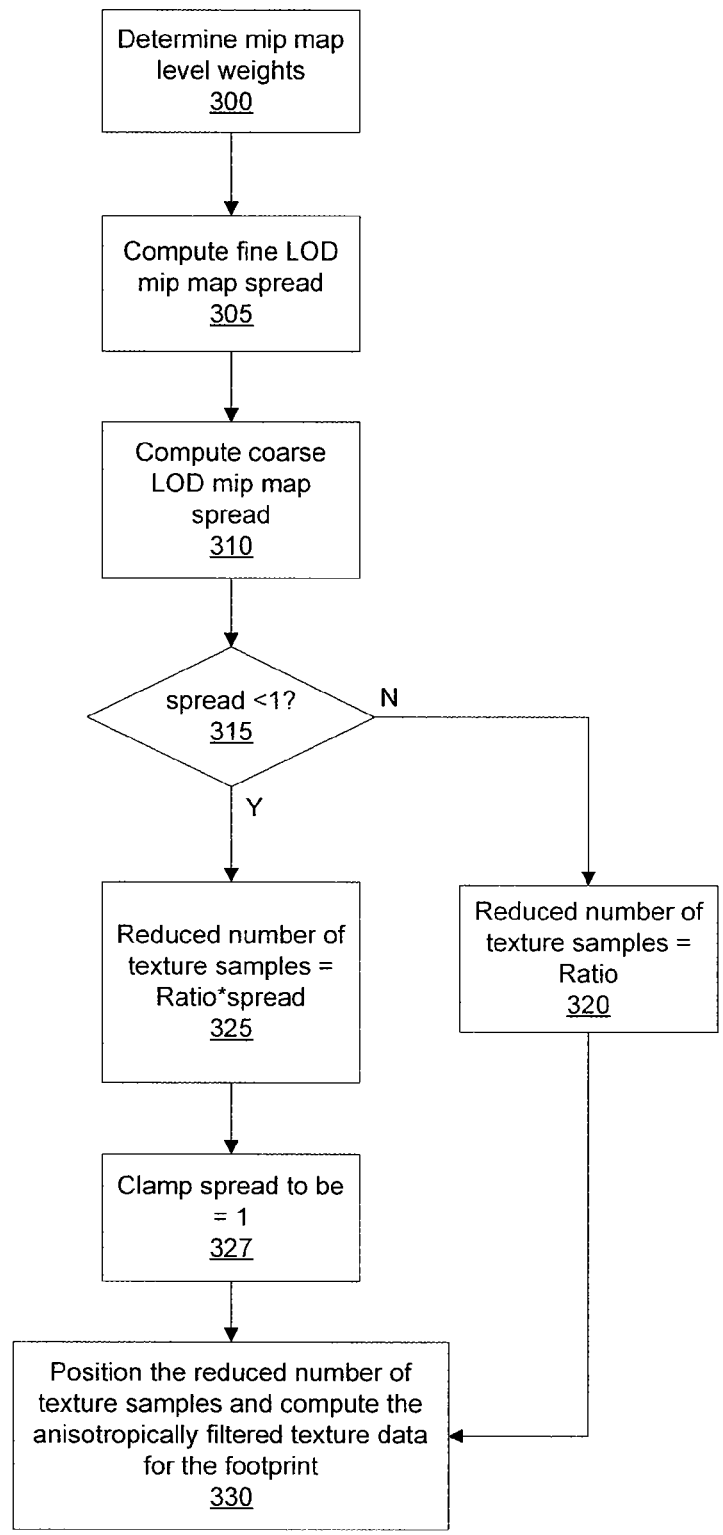
FIG. 3A illustrates an embodiment of a method for reducing the number of bilinear texture samples used to perform anisotropic filtering in accordance with one or more aspects of the present invention.

FIG. 3A illustrates an embodiment of a method for performing anisotropic filtering in accordance with one or more aspects of the present invention. In step 300 mip map level weights are determined for the fine and coarse LOD mip maps, (1−LODfrac) and LODfrac, respectively. In step 305 the method computes the fine LOD spread as:

$$\text{Spread fine}=2^{LODfrac},$$

Where LODfrac is the mip map level weight for the coarse LOD. In step 310 the method computes the coarse LOD spread as:

$$\text{Spread coarse}=2^{(LODfrac-1)},$$

where (LODfrac−1) is the mip map level weight for the fine LOD negated.

In step 315 the method determines if the spread for the fine or coarse LOD is less than one, and, if not, the method proceeds to step 325. Otherwise, in step 320 the reduced number of bilinear texture samples is computed as the anisotropic ratio for the footprint. In step 325 the method computes the reduced number of bilinear texture samples for an LOD by scaling the anisotropic ratio for the footprint by the spread for the LOD. The number of bilinear texture samples for each LOD is reduced so that when the bilinear texture samples are evenly spaced along the major axis in each LOD, they are spaced at least one texel apart, as described in conjunction with FIGS. 3B and C.

In step 327 the spread of less than one is clamped to be equal to one. When the spread is less than one, it is increased to one to avoid oversampling of the footprint caused by spacing the reduced number of samples by a spread of less than one. In step 330 the reduced number of bilinear texture samples are positioned to cover the major axis in the fine and coarse LOD mip maps and an anisotropically filtered texture value is computed for the footprint corresponding to the major axis of anisotropy. The reduced number of bilinear texture samples may be evenly spaced to cover the major axis or the reduced number of bilinear texture samples may be spaced according to the spread, i.e., each sample is spaced a spread apart from another sample. In other embodiments of the present invention, equivalent positioning of the bilinear texture samples is achieved by setting the spread to one and setting the reduced number of bilinear texture samples as the length (in texels) of the anisotropic footprint.

In some embodiments of the present invention, four texels are obtained and bilinearly filtered to compute each bilinear sample. The bilinear samples are each scaled by their corresponding computed weight and summed to produce a filtered texture value for an anisotropic footprint within an LOD texture map (fine or coarse). Persons skilled in the art will appreciate that any system configured to perform the method steps of FIG. 3A or their equivalents, is within the scope of the present invention.

Figure 3B:
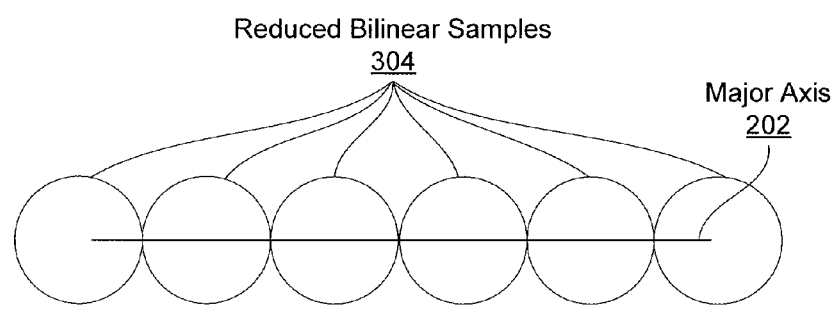
FIG. 3B illustrates a reduced number of reduced bilinear texture samples spaced along the major axis for a coarse LOD mip map in accordance with one or more aspects of the present invention.

FIG. 3B illustrates a reduced number of bilinear texture samples spaced along the major axis for a coarse LOD mip map in accordance with one or more aspects of the present invention. A reduced number of bilinear texture samples, reduced bilinear samples 304 for a coarse LOD mip map, are computed and spaced along major axis 202 (of FIGS. 2A, 2B, and 2C) according to the method described in conjunction with FIG. 3A. In comparison with FIG. 1D, in which ten bilinear samples are used from the coarse LOD mip map, the number of bilinear texture samples is reduced. The mip map level weight for the fine LOD is determined as (1−0.807) or 0.193 and the coarse LOD mip map spread is computed as 0.8747. The anisotropic ratio for footprint 201 is 5 and is scaled by 0.8747 to produce the reduced number of samples as 4.375 for the coarse LOD. As shown in FIG. 3B, the spacing of reduced number of bilinear texture samples 304 is one texel, matching the spacing shown in FIG. 2B. After computing the reduced number of bilinear texture samples, the spread of 0.8747 which is less than one texel is clamped to one texel.

Figure 1E:
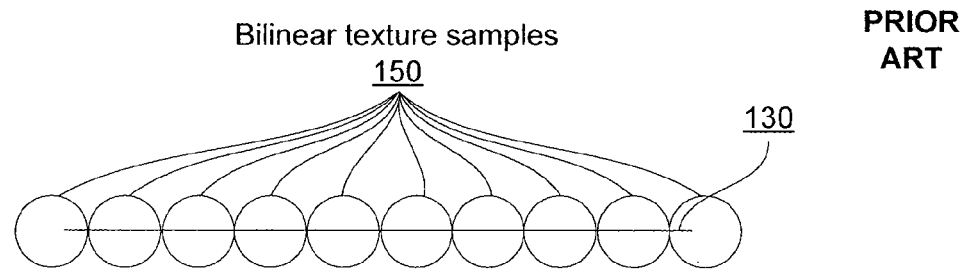
FIG. 1E illustrates a prior art application of bilinear samples that are positioned along a major axis to approximate an elliptical footprint for a fine LOD mip map.
Figure 3C:
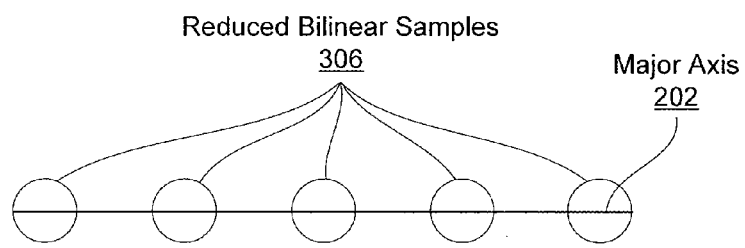
FIG. 3C illustrates a reduced number of reduced bilinear texture samples spaced along the major axis for a fine LOD mip map in accordance with one or more aspects of the present invention.

FIG. 3C illustrates a reduced number of reduced bilinear texture samples spaced along the major axis for a fine LOD mip map in accordance with one or more aspects of the present invention. A reduced number of bilinear texture samples, reduced bilinear samples 306 for a fine LOD mip map, are computed and spaced along major axis 202 (of FIGS. 2A, 2B, and 2C) according to the method described in conjunction with FIG. 3A. In comparison with FIG. 1E, in which ten bilinear samples are used to sample the fine LOD mip map, the number of bilinear texture samples is reduced. The mip map level weight for the coarse LOD is determined as 0.807 and the fine LOD mip map spread is computed as 1.75. Because the fine LOD mip map spread is greater than 1 the anisotropic ratio for footprint 201 is scaled by 1 to produce the reduced number of samples as 5 for the fine LOD. As shown in FIG. 3C, the spacing of reduced number of bilinear texture samples 306 is greater than one texel and the number of bilinear texture samples used is reduced compared with the number of bilinear texture samples shown in FIG. 2C. Reduced number of bilinear texture samples 306 may be spaced evenly along major axis 202, as shown in FIG. 3C or reduced number of bilinear texture samples 306 may be spaced according to the spread of 1.75 texels. The mip map level weight for the fine LOD is less than the mip map level weight for the coarse LOD, therefore a greater error in a filtered texture value for the fine LOD may be tolerated.

Figure 4A:
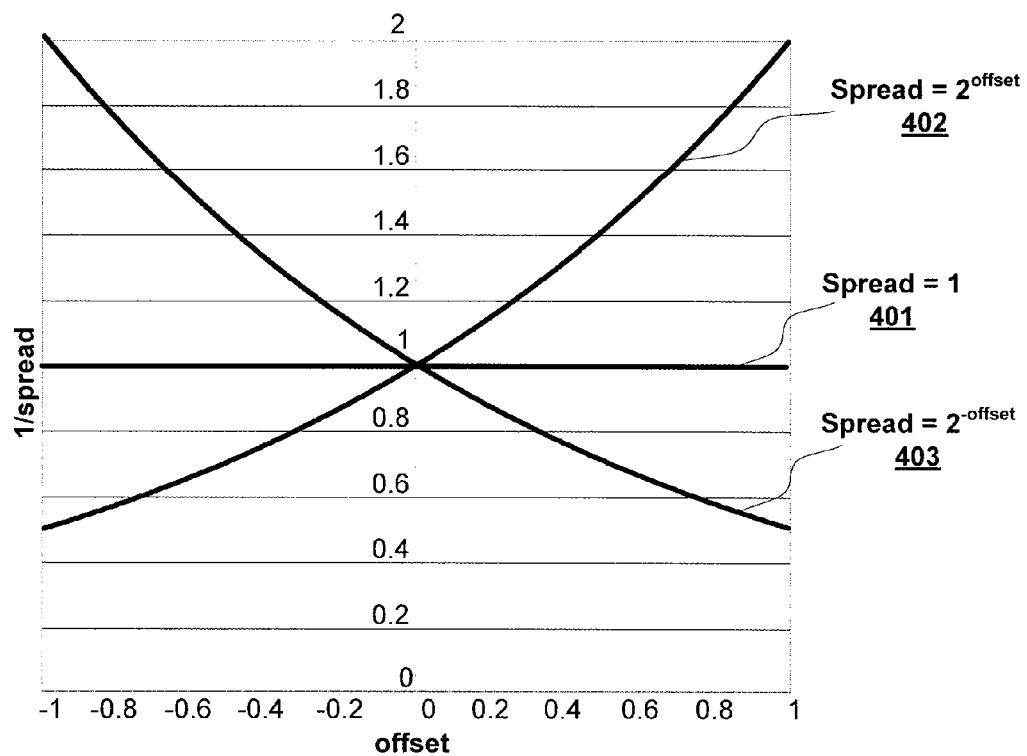
FIGS. 4A and 4B illustrate graphs of bilinear texture sample spread functions that may be applied to modify the number of bilinear texture samples in accordance with one or more aspects of the present invention.

FIG. 4A illustrates a graph of bilinear texture sample spread functions that may be applied to modify a number of bilinear texture samples in accordance with one or more aspects of the present invention. In some embodiments of the present invention, the number of bilinear texture samples may be a reduced number of bilinear texture samples computed using the techniques described in conjunction with FIG. 3A. In other embodiments of the present invention, the number of bilinear texture samples may be computed using techniques known to those skilled in the art.

The horizontal axis represents the offset from the coarse or fine LOD. The right side of the graph represents the reciprocal of the spread computed for the fine LOD mip map with offset=LODfrac ranging from 0 to 1. Note that the offset for the fine LOD mip map is equal to the mip map level weight for the coarse LOD. The left side of the graph represents the reciprocal of the spread computed for the coarse LOD mip map with offset=LODfrac−1 ranging from −1 to 0. Note that the offset for the coarse LOD mip map is equal to the negated mip map level weight for the fine LOD. The vertical axis represents 1/spread produced when various sample spread functions are applied to modify the spread, in turn, modifying the number of bilinear texture samples. The top half of the graph, with 1/spread greater than 1, corresponds to oversampling of an LOD and the bottom half of the graph, with 1/spread less than 1, corresponds to undersampling of an LOD. As previously described, oversampling is undesirable and undersampling may improve texture mapping performance while comprising image quality.

A first sample spread function produces the line spread=1 401 and sets the spread between each bilinear texture sample at one texel and is referred to as "spread function one." A second sample spread function, spread=$2^{-offset}$ produces the curve spread=$2^{-offset}$ 402 and is referred to as "spread function half." A third sample spread function, spread=$2^{offset}$ produces the curve spread=$2^{offset}$ 403 and is referred to as "spread function two." To prevent oversampling the second sample spread function should not be used for the fine LOD and the third sample spread function should not be used for the coarse LOD. In some embodiments of the present invention, a general spread function is used, spread=$2^{n*mip\ map\ level\ weight}$, where n is any real number. When the spread for a fine level of the mip mapped texture is computed, the mip map level weight used by the general spread function is the mip map level weight for a coarse level of the mip mapped texture map. Conversely, when the spread for the coarse level of the mip mapped texture is computed, the mip map level weight used by the general spread function is the mip map level weight for the fine level of the mip mapped texture map.

Figure 4B:
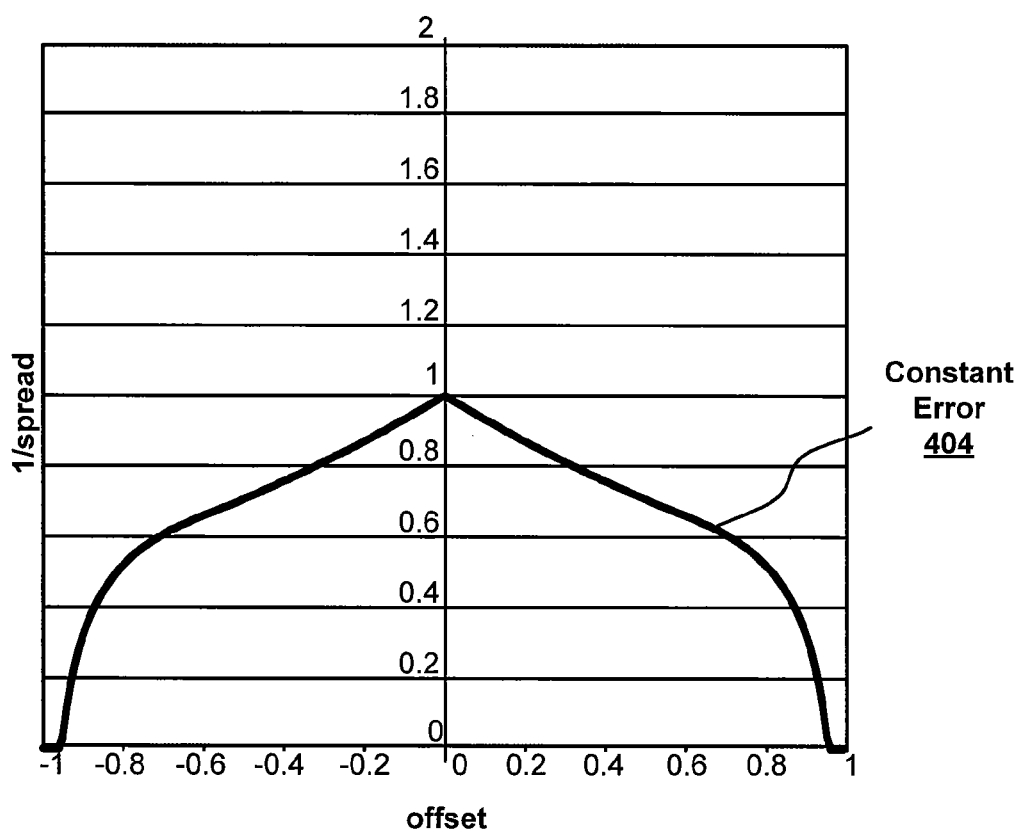

FIG. 4B illustrates a graph of a fourth bilinear texture sample spread function that may be applied to modify a number of bilinear texture samples in accordance with one or more aspects of the present invention. The fourth sample spread function produces the curve constant error 404 and is referred to as "spread function constant error." Constant error 404 is an approximation of a constant error and in various embodiments of the present invention, the approximation may differ. The constant error function for offset (LODfrac for the fine mip map and LODfrac−1 for the coarse mip map) less than −0.6 or greater than 0.6 is defined as:

$$1/\text{spread}=1-\text{sqrt}((k/2)/(1-|\text{offset}|)),$$

where k is the error per anisotropically filtered texture value scaled by the mip map level weight. The error is the difference between a theoretical anisotropically filtered texture value and the computed anisotropically filtered texture value for a particular spread and angle of anisotropy.

The constant error function for offset (LODfrac) between −0.6 and 0.6 is defined as:

$$1/\text{spread} = 2^{-|\text{offset}|},$$

where k is a constant that is computed based on a threshold value where the pieces of the piecewise function meet. In FIG. 4B the threshold value is 0.6 and k has a value of −0.0926, where the threshold corresponds to offsets of −0.6 and 0.6. In other embodiments of the present invention other values may be used for one or more threshold values. Specifically, k may be computed as:

$$k = 2(1-\text{threshold})(1-2^{-\text{threshold}})^2.$$

Note that constant error 404 produces spread values resulting in more undersampling than the other spread functions. Therefore, the number of bilinear texture samples will be reduced by a greater amount when the fourth function (constant error) is applied compared with when the first (one), second (half), or third (two) function is applied to modify the spread. Once the spread has been modified, the modified number of bilinear texture samples should be computed since the footprint should be maintained, i.e. spread*number of bilinear texture samples=footprint. Therefore, as the spread increases, the number of bilinear texture samples decreases. Those skilled in the art will understand that other functions may be specified to increase the spread and decrease the number of bilinear texture samples used to produce an anisotropically filtered texture sample for a footprint.

Figure 4C:
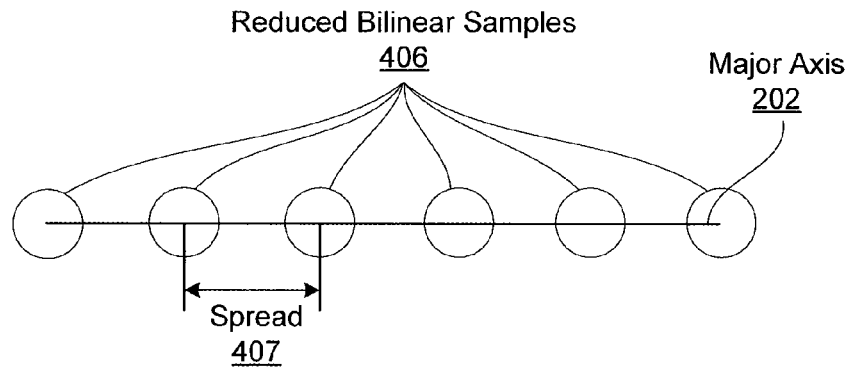
FIG. 4C illustrates bilinear texture samples spaced along the major axis for a fine LOD mip map using a spread function in accordance with one or more aspects of the present invention.

FIG. 4C illustrates reduced bilinear texture samples 406 spaced along major axis 202 (shown in FIG. 2A) for a fine LOD mip map using the third spread function, spread=$2^{\text{offset}}$, corresponding to the curve spread=two 403, in accordance with one or more aspects of the present invention. The spread between each bilinear texture sample of reduced bilinear texture samples 406 is computed as 1.75 texels for the LODfrac of 0.807. The reduced number of bilinear texture samples may then be computed using the spread. Specifically, the footprint length of 8.75 is maintained, so as the spread increases to 1.75, the number of bilinear texture samples is reduced accordingly. The reduced number of bilinear texture samples may be computed as footprint length/spread=5.0. The first spread function, spread=1, corresponding to the curve spread=one 401, may be used to modify the spread for the coarse LOD mip map. Using spread=1 results in a spacing as shown in FIG. 2B.

Figure 4D:
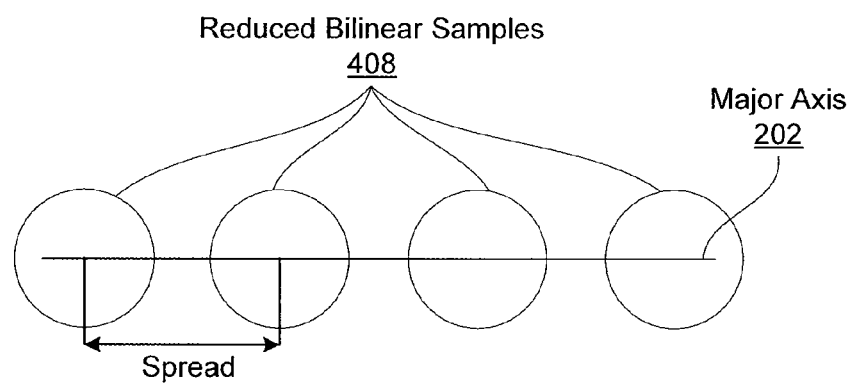
FIG. 4D illustrates bilinear texture samples spaced along the major axis for a coarse LOD mip map using a spread scale in accordance with one or more aspects of the present invention.

FIG. 4D illustrates reduced bilinear texture samples 408 spaced along major axis 202 for a coarse LOD mip map using a spread scale of 1.25 in accordance with one or more aspects of the present invention. Prior to applying the spread scale, a spread of 1.0 is used between each bilinear texture sample of bilinear texture samples 204 as shown in FIG. 2B. Application of the spread scale, as described in conjunction with FIG. 5A, produces spread 409 of 1.25 texels. The reduced number of bilinear texture samples may then be computed using spread 409. Specifically, the footprint length of 4.375 is maintained, so as the spread increases to 1.25, the number of bilinear texture samples is reduced accordingly. The reduced number of bilinear texture samples may be computed as footprint length/spread=3.5.

Figure 4E:
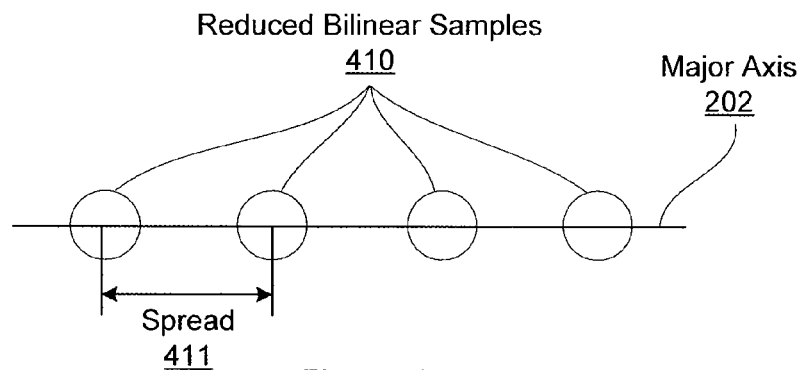
FIG. 4E illustrates bilinear texture samples spaced along the major axis for a fine LOD mip map using a spread scale in accordance with one or more aspects of the present invention.

FIG. 4E illustrates bilinear texture samples spaced along the major axis for a fine LOD mip map using a spread scale in accordance with one or more aspects of the present invention. Prior to applying the spread scale, a spread 407 of 1.75 is used between each bilinear texture sample of bilinear texture samples 406 as shown in FIG. 4C. Application of the spread scale, as described in conjunction with FIG. 5A, produces spread 411 of 2.187 texels. The reduced number of bilinear texture samples may then be computed using spread 411. Specifically, the footprint length of 8.75 is maintained, so as the spread increases to 2.187, the number of bilinear texture samples is reduced accordingly. The reduced number of bilinear texture samples may be computed as footprint length/spread=4.0.

Figure 4F:
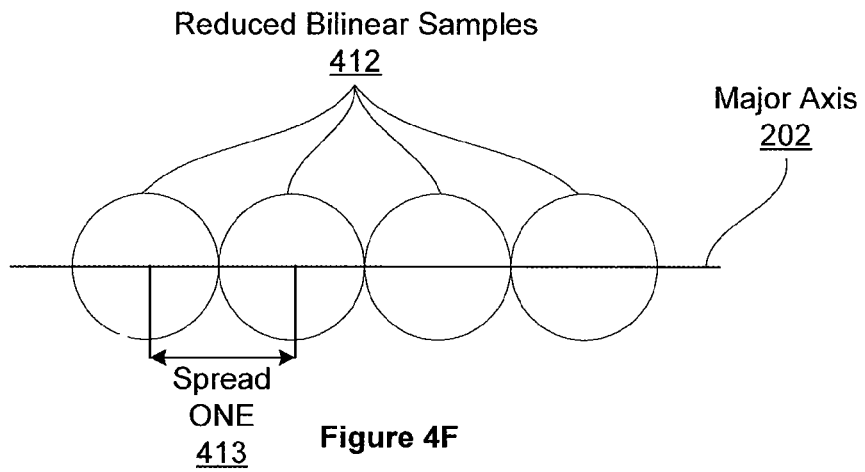
FIGS. 4F, 4G, and 4H illustrate bilinear texture samples spaced along the major axis using spread modifiers in accordance with one or more aspects of the present invention.

FIG. 4F illustrates bilinear texture samples spaced along the major axis for a coarse LOD mip map using a spread modifier ONE in accordance with one or more aspects of the present invention. The spread modifier ONE sets the spread to 1.0. The spread modifier ONE is applied to reduced bilinear samples 408 of FIG. 4D, resulting in reduced bilinear samples 412 with a spread, spread ONE 413, of one. Although the ends of major axis 202 are not sampled, texture cache performance may be improved due to an increase in locality. Different spread modifiers may be specified for the fine and coarse LOD mip maps. Using the spread modifier changes only the spread between the number of bilinear texture samples. Unlike the spread scale and the spread function, the number of bilinear texture samples is unchanged.

Figure 4G:
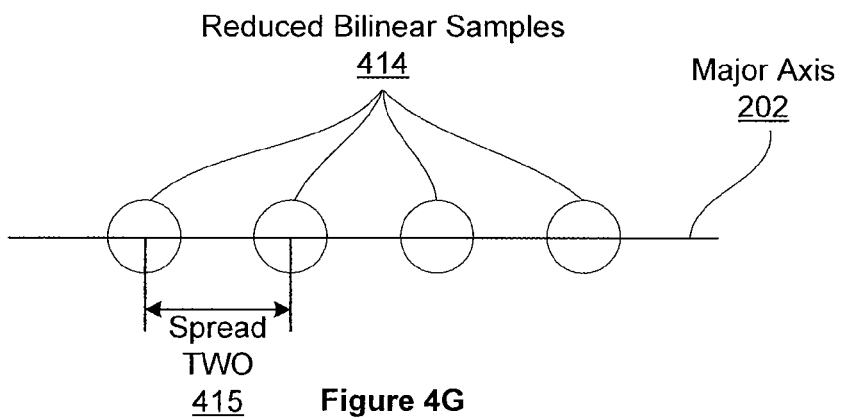

FIG. 4G illustrates bilinear texture samples spaced along the major axis for a fine LOD mip map using a spread modifier TWO in accordance with one or more aspects of the present invention. The spread modifier TWO sets the spread to 2.0. The spread modifier TWO is applied to reduced bilinear samples 410 of FIG. 4E, resulting in reduced bilinear samples 414 with a spread, spread TWO 415, of two. Although the ends of major axis 202 are not sampled, texture cache performance may be improved due to an increase in locality since the spread is reduced from 2.187 to 2.0.

Figure 4H:
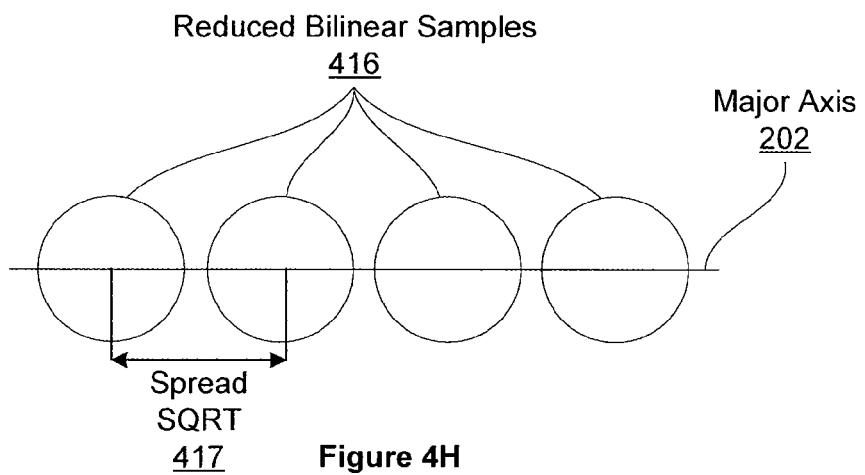

FIG. 4H illustrates bilinear texture samples spaced along the major axis for a coarse LOD mip map using a spread modifier SQRT in accordance with one or more aspects of the present invention. The spread modifier SQRT sets the spread to the square-root of the spread. The spread modifier SQRT is applied to reduced bilinear samples 408 of FIG. 4D, resulting in reduced bilinear samples 416 with a spread, spread SQRT 417, of 1.118. Although the ends of major axis 202 are not sampled, texture cache performance may be improved due to an increase in locality since the spread is reduced from 1.25 to 1.118.

Figure 5A:
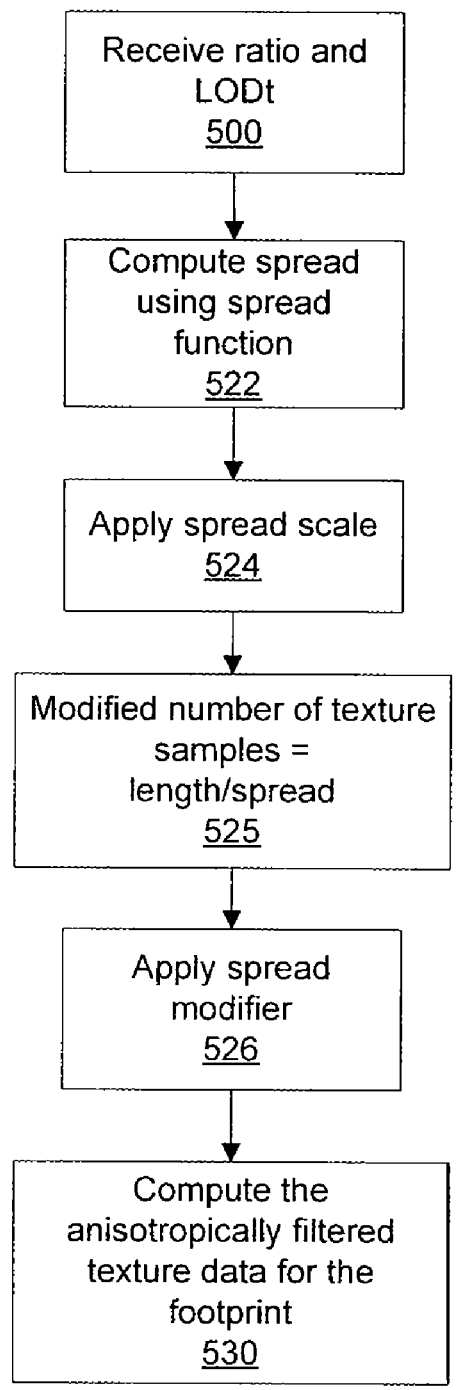
FIG. 5A illustrates an embodiment of a method for modifying the number of and spacing of texture samples along a major axis to perform anisotropic filtering in accordance with one or more aspects of the present invention.

FIG. 5A illustrates an embodiment of a method for modifying the number of and spacing bilinear texture samples along a major axis to perform anisotropic filtering in accordance with one or more aspects of the present invention. In step 500 an anisotropic ratio and a LODt value is received. As previously mentioned, LODt may be used to determine the fine and coarse LODs and LODfrac. In step 522 a spread function is used to compute the coarse spread and the fine spread, as described in conjunction with FIG. 5B. In some embodiments of the present invention different spread functions may be applied to each of the LOD mip maps (coarse and fine). The spread function may be used to compute the spread of a number of bilinear samples as illustrated in FIG. 4C. In step 524 a spread scale is applied to modify the coarse spread and the fine spread. In some embodiments of the present invention different spread scales may be applied to each of the LOD mip maps (coarse and fine). The spread scale may be used to modify the spread of a number of bilinear samples as illustrated in FIGS. 4D and 4E. Specifically, in some embodiments of the present invention the scale factor is computed using a 5 bit spread scale:

$$\text{Scale factor} = 2^{(\text{spread scale}/32)}.$$

In some embodiments of the present invention, the scale factor ranges in value from greater than or equal to 1 and less than 2. In other embodiments of the present invention the scale factor may be less than 1 or equal to or greater than 2. The spread is scaled by the scale factor to modify the spread. The spread scale may be set to 0 when the spread scale should not modify the spread. The scale factor may be set to a value of less than 1 to compensate for an aggressive spread function. The scale factor may be set to a value greater than 2 to aggressively reduce the number of bilinear texture samples. In some embodiments of the present invention, the spread scale or scale factor may be programmed for each particular texture map. In other embodiments of the present invention the spread scale or scale factor is fixed for one or more texture maps.

In step 525 the reduced or increased number of bilinear texture samples is computed by dividing the length of the major axis of the footprint by the spread. In order to maintain the anisotropic footprint, the number of bilinear texture samples is modified in response to modifications to the spread. Therefore, the spread function and spread scale may be used, alone or in combination, to compute and/or modify the number of bilinear texture samples, as previously described in conjunction with FIGS. 4C, D, and E. Alternatively, when the spread scale may be used in conjunction the method described in conjunction with FIG. 3A to further modify the number of bilinear texture samples, as described in conjunction with FIG. 5D.

Figure 5B:
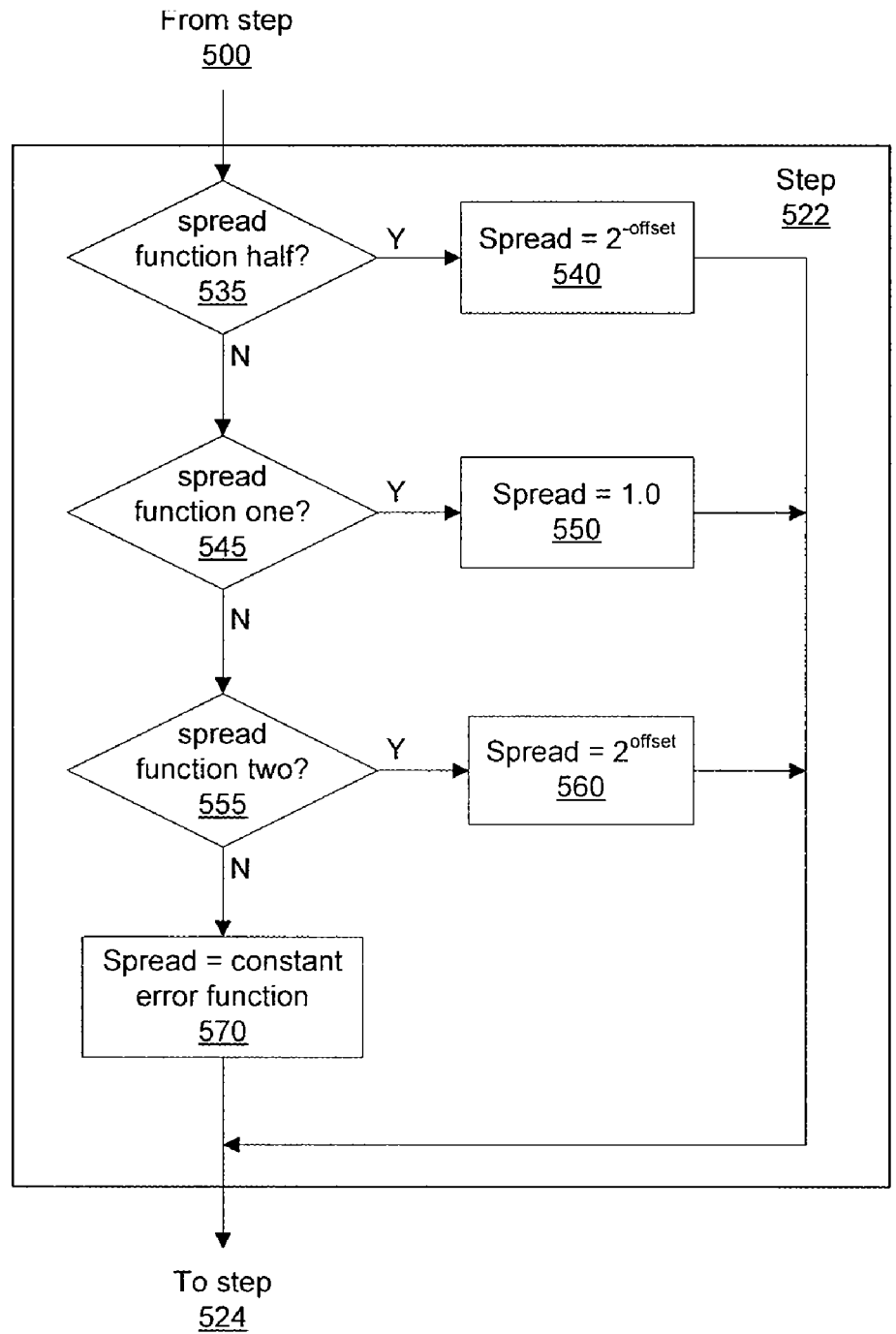
FIG. 5B illustrates an embodiment of step 522 of FIG. 5A in accordance with one or more aspects of the present invention.
Figure 5C:
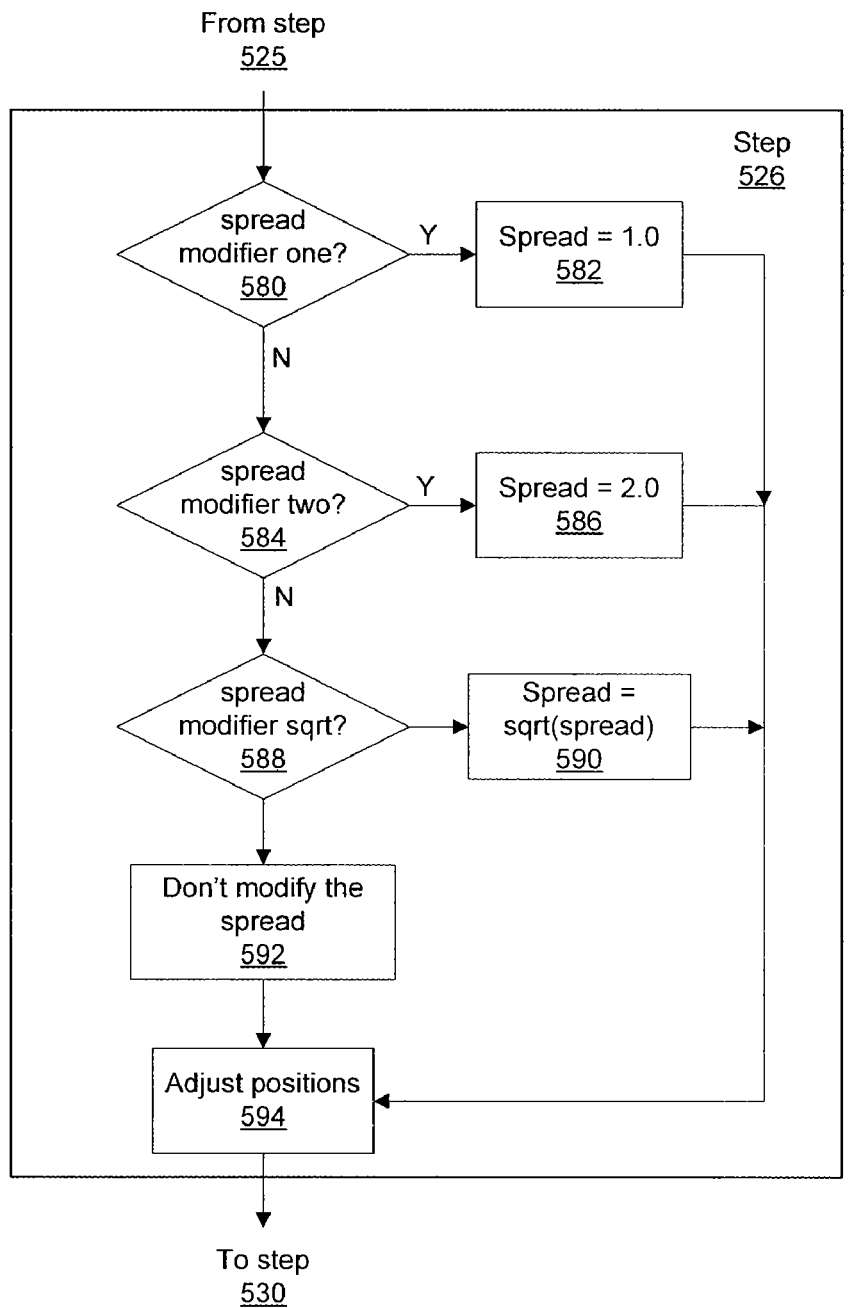
FIG. 5C illustrates an embodiment of step 524 of FIG. 5A in accordance with one or more aspects of the present invention.

In step 526 a spread modifier is applied to modify the coarse spread and the fine spread, as described in conjunction with FIG. 5C. In some embodiments of the present invention different spread modifiers may be applied to each of the LOD mip maps (coarse and fine). The spread modifier is used to modify the spacing between each of a number of bilinear texture samples positioned along the major axis without modifying the number of bilinear texture samples. Step 530 is performed as described in conjunction with step 330 of FIG. 3A to produce an anisotropically filtered texture value for the footprint.

FIG. 5B illustrates an embodiment of step 522 of FIG. 5A in accordance with one or more aspects of the present invention. Step 522 may be performed for the fine LOD mip map and for the coarse LOD mip map to modify the spread and reduce the number of bilinear texture samples. In step 535 the method determines if the spread function is the second spread function, spread function half, and, if so, then in step 540 the spread is computed using the function $2^{-offset}$ and the method proceeds to step 524. If, in step 535 the method determines that the spread function is not the second spread function, then the method proceeds to step 545. In step 545 the method determines if the spread function is the first spread function, spread function one, and, if so, then in step 550 the spread is computed using the function and set to a value of one and the method proceeds to step 524.

If, in step 545 the method determines that the spread function is not the first spread function, then the method proceeds to step 555. In step 555 the method determines if the spread function is the third spread function, spread function two, and, if so, then in step 560 the spread is computed using the function $2^{offset}$ and the method proceeds to step 524. If, in step 555 the method determines that the spread function is not the third spread function, then the method proceeds to step 570. In step 570 the spread is computed using the constant error function as described in conjunction with FIG. 4B, and the method proceeds to step 524. In other embodiments of the present invention, other spread functions, for example spread functions that vary the spread monotonically as a function of LODfrac, spread functions that vary with the angle of anisotropy, and continuous functions may be specified and used to compute the spread. Examples of functions of LODfrac include functions that increase the spread for a fine LOD of the mip mapped texture as a coarse mip map level weight increases, as (1−the fine mip map level weight) increases, or as 'offset' increases. Similarly, examples of functions of LODfrac also include functions that increase the spread for a coarse LOD of the mip mapped texture as a fine mip map level weight increases, as (1−the coarse mip map level weight) increases, or as 'offset' increases.

FIG. 5C illustrates an embodiment of step 524 of FIG. 5A in accordance with one or more aspects of the present invention. Step 524 may be performed for the fine LOD mip map and for the coarse LOD mip map to modify the spread after the number of bilinear texture samples has been computed. In particular, the spread may be modified to improve texture cache performance. For example, the spread may be reduced to space the reduce number of bilinear texture samples closer together to increase the cache hit rate.

In step 580 the method determines if the spread modifier is one, and, if so, in step 582 the spread is set to 1.0 and the method proceeds to step 594. If, in step 580 the method determines that the spread modifier is not one, then in step 584, the method determines if the spread modifier is two. If, in step 584, the method determines that the spread modifier is two, then in step 586 the spread is set to 2.0 and the method proceeds to step 594.

If, in step 584, the method determines that the spread modifier is not two, then in step 588 the method determines if the spread modifier is sqrt (square root). If, in step 588, the method determines that the spread modifier is sqrt, then in step 590 the spread is set to the square root of the spread and the method proceeds to step 594. If, in step 588, the method determines that the spread modifier is not sqrt, then in step 592 the spread is not modified. In step 594 the positions of the reduced number of bilinear texture samples along the major axis are adjusted according to the spread.

Figure 5D:
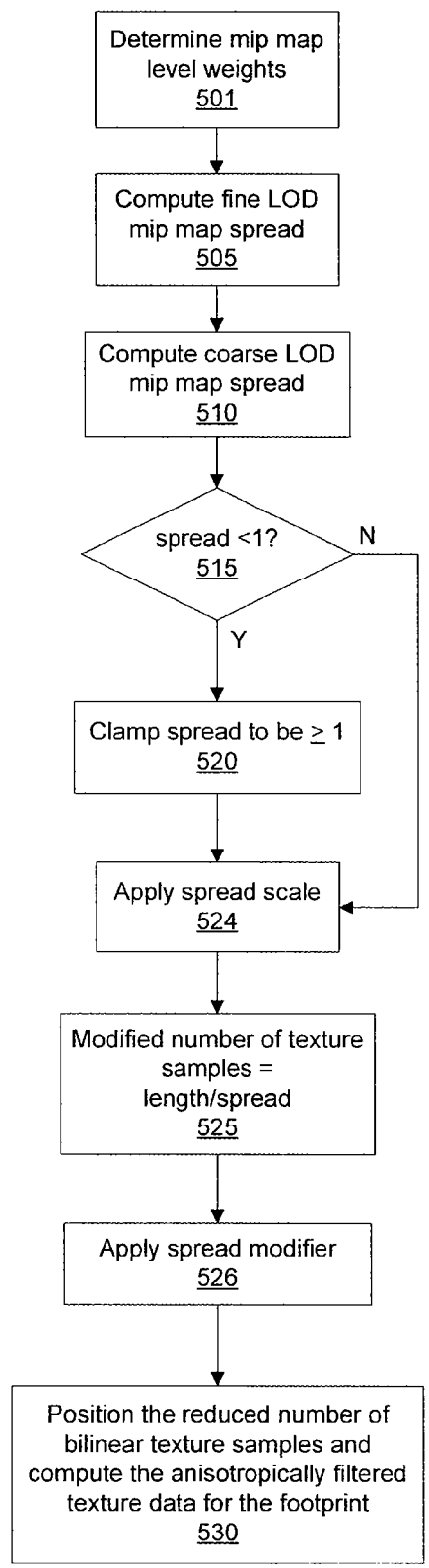
FIG. 5D illustrates another embodiment of a method for modifying the number of and spacing of texture samples along a major axis to perform anisotropic filtering in accordance with one or more aspects of the present invention.

FIG. 5D illustrates another embodiment of a method for reducing and spacing bilinear texture samples along a major axis to perform anisotropic filtering in accordance with one or more aspects of the present invention. Steps 501, 505, 510, and 515 are completed in the same manner as previously described steps 300, 305, 310, and 315 of FIG. 3A, respectively, to produce a coarse spread and a fine spread corresponding to each LOD. In some embodiments of the present invention, other methods may be used to compute a spread for a coarse and/or a fine LOD mip map, including methods that do not use mip map level weights.

In step 515 the method determines if the spread is less than one, and, if so, in step 523 the spread is clamped to be one. If, in step 515 the method determines that the spread is not less than one, then the method proceeds to step 524. Steps 524, 525, 526, and 530 are completed as previously described in conjunction with FIG. 5A to further reduce the reduced number of bilinear texture samples and modify the spread of the reduced number of bilinear texture samples.

The number of bilinear texture samples used to produce an anisotropically filtered texture value for a footprint may be reduced by computing a spread based on a mip map level weight. Similarly, the number of bilinear texture samples used to produce an anisotropically filtered texture value for a footprint may be reduced by using a spread function. The number of bilinear texture samples may be further reduced by applying a spread function and/or a spread scale. The spread between each bilinear texture samples within the further reduced or the reduced number of bilinear texture samples may be modified using the spread modifier. Persons skilled in the art will appreciate that any system configured to perform the method steps of FIGS. 5A, 5B, 5C, and 5D, or their equivalents, are within the scope of the present invention.

Figure 6:
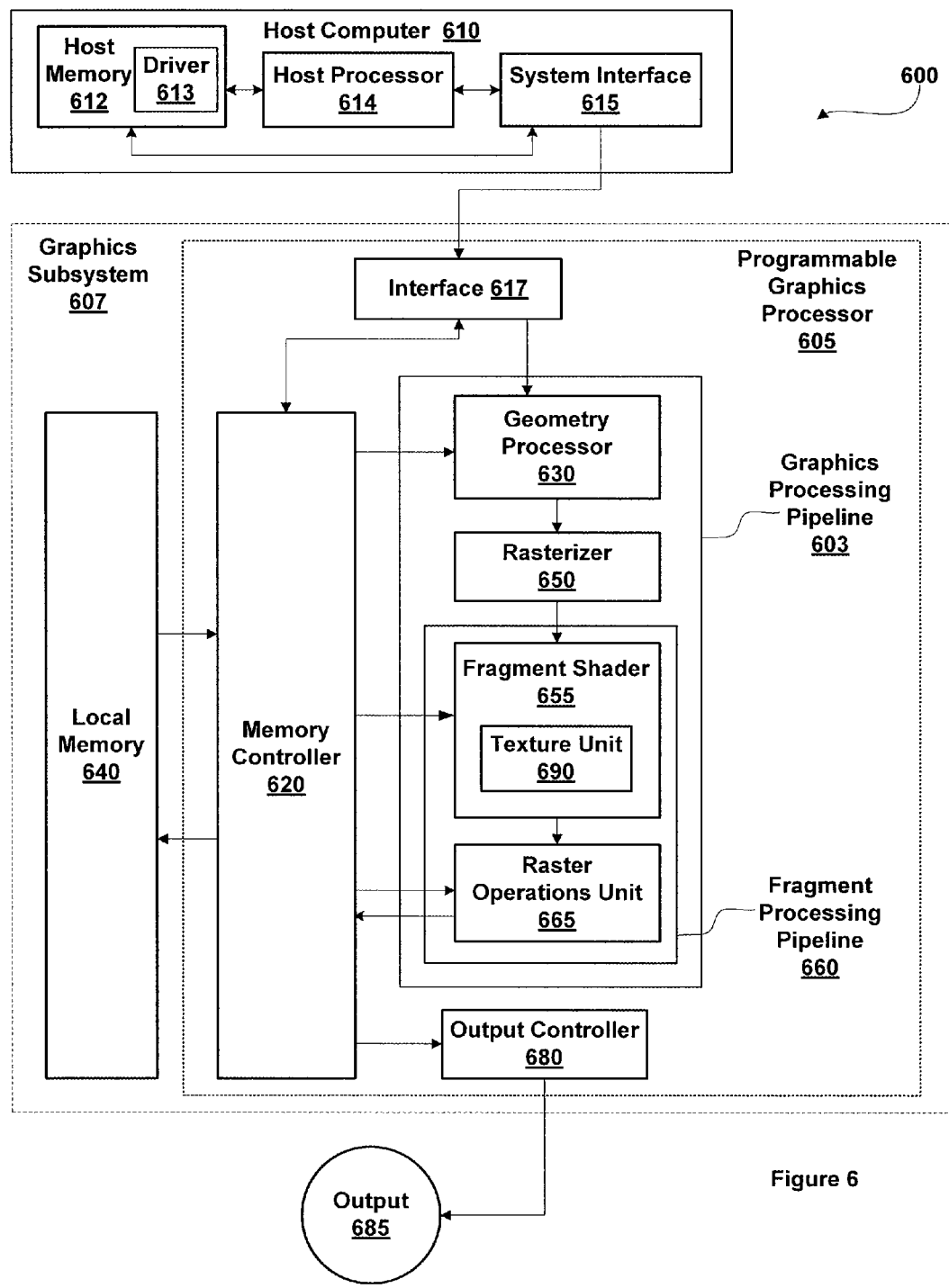
FIG. 6 is a block diagram of an exemplary embodiment of a respective computer system in accordance with one or more aspects of the present invention including a host computer and a graphics subsystem.

FIG. 6 is a block diagram of an exemplary embodiment of a respective computer system, generally designated 600, and including a host computer 610 and a graphics subsystem 607 in accordance with one or more aspects of the present invention. Computing system 600 may be a desktop computer, server, laptop computer, palm-sized computer, tablet computer, game console, portable wireless terminal such as a PDA (personal digital assistant) or cellular telephone, computer based simulator, or the like. Host computer 610 includes host processor 614 that may include a system memory controller to interface directly to host memory 612 or may communicate with host memory 612 through a system interface 615. System interface 615 may be an I/O (input/output) interface or a bridge device including the system memory controller to interface directly to host memory 612. An example of system interface 615 known in the art includes Intel® Northbridge.

A graphics device driver, driver 613, interfaces between processes executed by host processor 614, such as application programs, and a programmable graphics processor 605, translating program instructions as needed for execution by programmable graphics processor 605. Driver 613 may program parameters for the spread modifier, spread function, and/or spread scale features. The parameters may specify the type of spread to be used, e.g. one, two, half, or constant error for the spread function and one, two, or sqrt for the spread modifier. The parameters may also include a spread scale or spread factor for use with the spread scale feature.

Graphics subsystem 607 includes a local memory 640 and programmable graphics processor 605. Host computer 610 communicates with graphics subsystem 670 via system interface 615 and a graphics interface 617 within programmable graphics processor 605. Data, program instructions, and commands received at graphics interface 617 can be passed to a graphics processing pipeline 603 or written to a local memory 640 through memory management unit 620. Programmable graphics processor 605 uses memory to store graphics data, including texture maps, and program instructions, where graphics data is any data that is input to or output from computation units within programmable graphics processor 605. Graphics memory is any memory used to store graphics data or program instructions to be executed by programmable graphics processor 605. Graphics memory can include portions of host memory 612, local memory 640 directly coupled to programmable graphics processor 605, storage resources coupled to the computation units within programmable graphics processor 605, and the like. Storage resources can include register files, caches, FIFOs (first in first out memories), and the like.

In addition to interface 617, programmable graphics processor 605 includes a graphics processing pipeline 603, a memory controller 620 and an output controller 660. Data and program instructions received at interface 617 can be passed to a geometry processor 630 within graphics processing pipeline 603 or written to local memory 640 through memory controller 620. In addition to communicating with local memory 640, and interface 617, memory controller 620 also communicates with graphics processing pipeline 603 and output controller 660 through read and write interfaces in graphics processing pipeline 603 and a read interface in output controller 680.

Within graphics processing pipeline 603, geometry processor 630 and a programmable graphics fragment processing pipeline, fragment processing pipeline 660, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 630 and fragment processing pipeline 660 are optionally configured such that data processing operations are performed in multiple passes through graphics processing pipeline 603 or in multiple passes through fragment processing pipeline 660. Each pass through programmable graphics processor 605, graphics processing pipeline 603 or fragment processing pipeline 660 concludes with optional processing by a raster operations unit 665.

Vertex programs are sequences of vertex program instructions compiled by host processor 614 for execution within geometry processor 630 and rasterizer 650. Shader programs are sequences of shader program instructions compiled by host processor 614 for execution within fragment processing pipeline 660. Geometry processor 630 receives a stream of program instructions (vertex program instructions and shader program instructions) and data from interface 617 or memory controller 620, and performs vector floating-point operations or other processing operations using the data. The program instructions configure subunits within geometry processor 630, rasterizer 650 and fragment processing pipeline 660. The program instructions and data are stored in graphics memory, e.g., portions of host memory 612, local memory 640, or storage resources within programmable graphics processor 605.

Data processed by geometry processor 630 and program instructions are passed from geometry processor 630 to a rasterizer 650. Rasterizer 650 is a sampling unit that processes primitives and generates sub-primitive data, such as fragment data, including parameters associated with fragments (texture identifiers, texture coordinates, and the like). Rasterizer 650 converts the primitives into sub-primitive data by performing scan conversion on the data processed by geometry processor 630. Rasterizer 650 outputs fragment data and shader program instructions to fragment processing pipeline 660.

The shader programs configure the fragment processing pipeline 660 to process fragment data by specifying computations and computation precision. Fragment shader 655 is optionally configured by shader program instructions such that fragment data processing operations are performed in multiple passes within fragment shader 655. Fragment shader 655 includes texture unit 690 to perform anisotropic or isotropic texture mapping and produce filtered texels. Texture unit 690 approximates anisotropic footprints and may be configured to perform optimizations, such as computing and modifying the spread or number of bilinear texture samples for anisotropically filtered fragments, to produce textured fragments while balancing image quality and performance. The textured fragments are processed using techniques known to those skilled in the art to produce shaded fragment data.

Fragment shader 655 outputs the shaded fragment data, e.g., color and depth, and codewords generated from shader program instructions to raster operations unit 665. Raster operations unit 665 includes a read interface and a write interface to memory controller 620 through which raster operations unit 665 accesses data stored in local memory 640 or host memory 612. Raster operations unit 665 optionally performs near and far plane clipping and raster operations, such as stencil, z test, blending, and the like, using the fragment data and pixel data stored in local memory 640 or host memory 612 at a pixel position (image location specified by x,y coordinates) associated with the processed fragment data.

The output data from raster operations unit 665 is written back to local memory 640 or host memory 612 at the pixel position associated with the output data and the results, e.g., image data are saved in graphics memory.

When processing is completed, an output 685 of graphics subsystem 607 is provided using output controller 680. Alternatively, host processor 614 reads the image stored in local memory 640 through memory controller 620, interface 617 and system interface 615. Output controller 680 is optionally configured by opcodes to deliver data to a display device, network, electronic control system, other computing system 600, other graphics subsystem 607, or the like.

Figure 7:
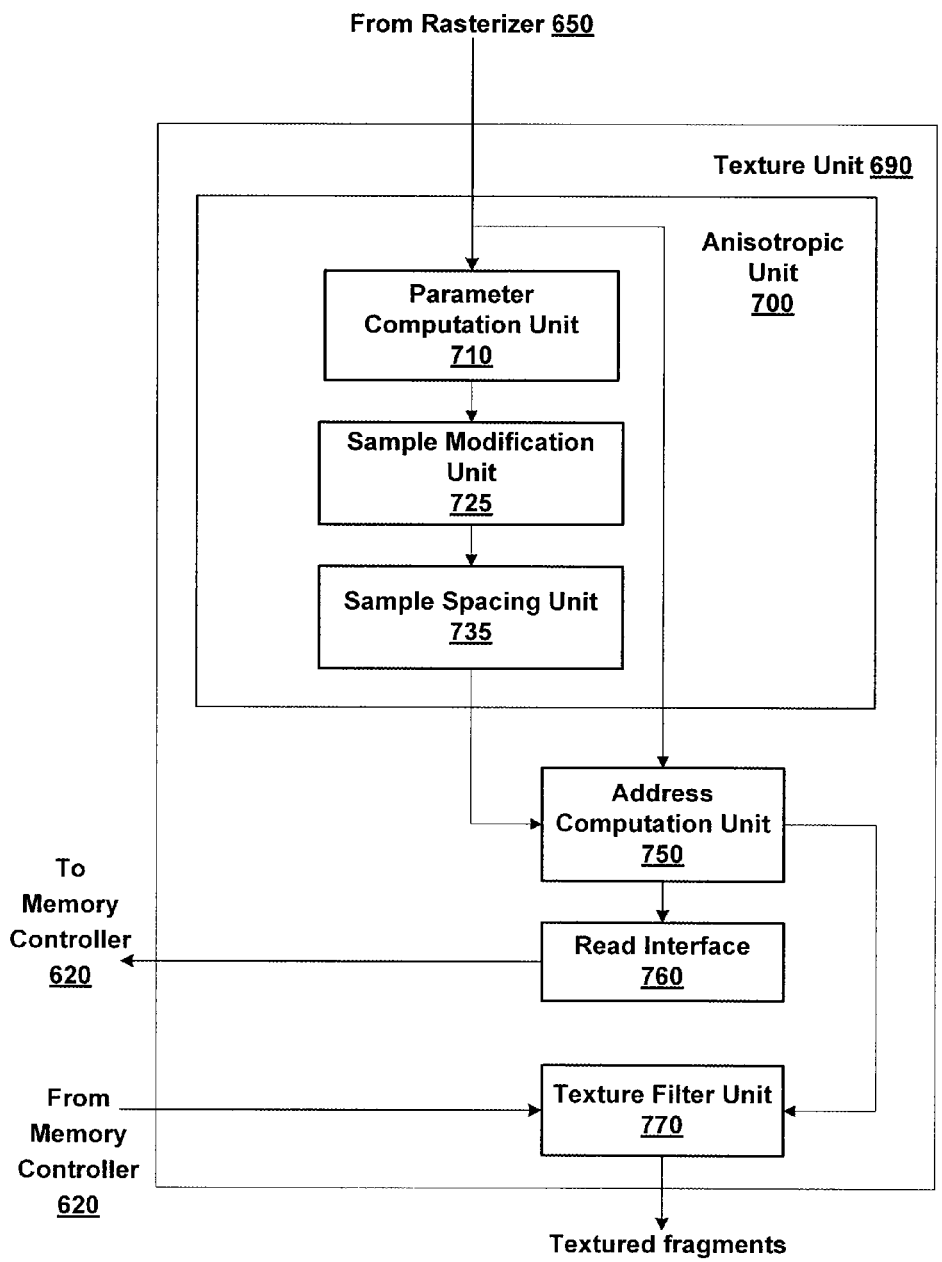
FIG. 7 is a block diagram of an exemplary embodiment of the texture unit from FIG. 6 in accordance with one or more aspects of the present invention.

FIG. 7 is a block diagram of an exemplary embodiment of texture unit 690 from FIG. 6 in accordance with one or more aspects of the present invention. In some embodiments, Texture unit 690 receives data, e.g., program instructions and parameters associated with fragments (texture identifiers, texture coordinates such as s, t, and r, and the like) from a rasterizer, such as rasterizer 650. Texture coordinates s, t, and r are typically represented in a floating point format such as a 32 bit format (1 bit sign, 23 bit mantissa, and 8 bit exponent). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. Texture unit 690 receives texture coordinates from rasterizer 650, uses the texture coordinates to perform anisotropic texture filtering of texels read from memory, and then outputs a filtered texture value corresponding to a set of texture coordinates associated with a fragment, e.g., a textured fragment.

Texture unit 690 includes an anisotropic unit 700. At a high level, anisotropic unit 700 computes anisotropic texture mapping parameters such as LODt, the logratio and/or anisotropic ratio, angle of anisotropy, and the axis of anisotropy, using techniques known to those skilled in the art. As previously described, these anisotropic texture mapping parameters are used to determine the number, spacing (spread), and mip map level weights of bilinear texture samples to perform anisotropic texture filtering for a fragment.

In some embodiments of the present invention, anisotropic unit 700 outputs unnormalized texture coordinates, such as u, v, and p, that are dependent on mipmap dimensions for LODcoarse and LODfine and that are typically represented in a fixed point format. In other embodiments of the present invention, anisotropic unit 700 outputs normalized texture coordinates, such as s, t, and r. Anisotropic unit 900 also outputs bilinear texture sample positions, mip map level weights, LODfrac, LODfine, and LODcoarse.

A parameter computation unit 710 computes an anisotropic parameter, e.g., anisotropic ratio, or the like, using techniques known to those skilled in the art. Parameter computation unit 710 may also compute LODt, the axis of anisotropy, the length of the axis of anisotropy, and the like.

A bilinear sample reduction unit 725 computes a number of bilinear texture samples, reduces the number of bilinear texture samples, and computes a spread used to space the number of bilinear texture samples along the major axis of anisotropy. For example, bilinear sample reduction unit 725 may be configured to perform steps 300, 305, 310, 315, 320, and 325 of FIG. 3A. In another embodiment of the present invention, bilinear sample reduction unit 725 may also be configured to perform steps 500, 522, 524, and 525 of FIG. 5A. In yet another embodiment of the present invention, bilinear sample reduction unit 725 may also be configured to perform steps 501, 505, 510, 515, 523, 524, and 525 of FIG. 5D. Bilinear sample reduction unit 725 outputs the mip map level weights, spread, and the reduced number of bilinear texture samples.

A bilinear sample spacing unit 735 modifies the spread used to space the reduced number of bilinear texture samples along the major axis of anisotropy and positions the reduced number of bilinear texture samples along the major axis of anisotropy. For example, bilinear sample spacing unit 735 may be configured to perform step 526 of FIGS. 5A and 5D. Bilinear sample spacing unit 735 outputs the mip map level weight, bilinear sample weight, and a position, e.g., and unnormalized texture coordinates, such as u, v, and p, of each bilinear texture sample.

Address computation unit 750 uses the bilinear texture sample positions and texture parameters (texture identifier, and the like) received by texture unit 690 to determine addresses for reading texels (the first number of texels or the first and the second number of texels) from memory, e.g., local memory 640, host memory 612, or the like. Address computation unit 750 outputs the addresses to read interface 760. Read interface 760 outputs the addresses and a read request to memory controller 620.

The texels for each bilinear texture sample received by read interface 760 for one or more LODs, e.g., LODfine and LODcoarse, of a mip mapped texture map and are bilinearly or trilinearly filtered in a texture filter unit 770 to produce texture data for each bilinear texture sample. Texture filter unit 770 may receive fractional unnormalized texture coordinate values and LODfrac from address computation unit 760 to perform the bilinear or trilinear filtering. Texture filter unit 770 also receives the bilinear texture sample weights computed by bilinear sample computation unit 725 and scales the texture data for each bilinear texture sample by its corresponding weight and by the LOD weight. The scaled texture data is combined to produce a filtered texture value for an anisotropic footprint corresponding to a fragment, i.e., a textured fragment. Textured fragments are further processed within a fragment shader, to compute a color for each fragment. In other embodiments of anisotropic unit 700 additional units may be included to perform other texture mapping functions known to those skilled in the art.

Conventionally, the same number of texture samples is used to sample the coarse LOD and the fine LOD. Therefore, the coarse LOD is oversampled and more texels are read and processed than are needed to produce an image of acceptable quality. The number of texture samples may be reduced based on a mip map level weight to produce each anisotropically filtered texture value, possibly improving system performance. The spacing between each of the texture samples may also be modified, in turn reducing or increasing the number of texture samples. Additionally, the spacing between each of the texture samples may be modified to improve the image quality or caching performance for reading texels without changing the number of texture samples.

While the foregoing is directed to embodiments of the present invention, other and further embodiments of the invention may be devised without departing from the basic scope thereof, and the scope thereof is determined by the claims that follow. Specifically, persons skilled in the art will recognize that texture sample modification and spacing techniques set forth herein may be implemented either partially or entirely in a software program or a shader program executed by fragment shader 655 or host processor 614. The foregoing description and drawings are, accordingly, to be regarded in an illustrative rather than a restrictive sense. The listing of steps in method claims do not imply performing the steps in any particular order, unless explicitly stated in the claim. Furthermore, although the texture samples that are used in various embodiments of the present invention may be produced using linear filtering or other image reconstruction filtering techniques known to those skilled in the art.

All trademarks are the respective property of their owners.

The invention claimed is:

1. A computer system for performing anisotropic texture mapping to produce filtered texture values, comprising:
    a memory configured to store a mip mapped texture; and
    a texture unit including a sample modification unit, a sample spacing unit, and a filter unit, wherein
        the sample modification is configured to compute a spread equal or greater than one texel for a first number of texture samples based on a mip map level weight and compute a second number of texture samples that is different than the first number of texture samples, for a first level of detail of the mip mapped texture using the spread, wherein the mip map level weight for a coarse level of detail of the mip mapped texture relative to the first level of detail is a fractional portion of a log base two of a minor axis length and the mip map level weight for a fine level of detail of the mip mapped texture relative to the first level of detail is a difference between one and the fractional portion of the log base two of the minor axis length;
        the sample spacing unit is configured to position the second number of texture samples along a major axis of anisotropy according to the spread; and
        the filter unit is configured to filter the second number of texture samples to produce a filtered texture value for an anisotropic pixel footprint.

2. The texture unit of claim 1, wherein the sample spacing unit is configured to clamp the spread to one when the spread is less than one prior to positioning the second number of samples along the major axis.

3. The texture unit of claim 2, wherein the second number of texture samples is computed as a ratio of the anisotropic pixel footprint scaled by the spread.

4. The texture unit of claim 1, wherein the sample spacing unit is configured to determine a modified spread between each of the second number of texture samples for the level of detail of the mip mapped texture by applying a spread modifier.

5. The texture unit of claim 1, wherein the sample spacing unit is configured to position the second number of samples spaced evenly along the major axis.

6. The texture unit of claim 1, wherein the sample modification unit is configured to compute the spread for the number of texture samples based on an angle of anisotropy for the anisotropic pixel footprint.

7. The texture unit of claim 1, wherein the sample modification unit is configured to scale the spread by a parameter to increase or decrease the second number of texture samples for the fine level of detail or the coarse level of detail of the mip mapped texture.

8. The texture unit of claim 1, wherein the sample modification unit is configured to compute the second number of texture samples using a spread function that computes the spread for the fine level of detail of the mip mapped texture to equal at least two raised to a power of a product of n and a mip map level weight for the coarse level of detail of the mip mapped texture texels.

9. The texture unit of claim 1, wherein the sample modification unit is configured to compute the second number of texture samples using a spread function that computes the spread for the coarse level of detail of the mip mapped texture to equal at least two raised to a power of a product of n and a mip map level weight for the fine level of detail of the mip mapped texture texels, where n is any real number.

10. The texture unit of claim 1, wherein the sample modification unit is configured to compute the second number of texture samples for the first level of detail of the mip mapped texture using a spread function that increases the spread monotonically for the first level of detail of the mip mapped texture as the mip map level weight decreases.

11. The texture unit of claim 1, wherein the second number of texture samples is computed as a length of a major axis of the anisotropic pixel footprint divided by the spread.

12. A non-transitory computer-readable medium containing a program which, when executed by a programmable graphics processor, performs a process for performing anisotropic texture mapping to produce filtered texture values, the process comprising:
    computing a spread equal or greater than one texel for a first number of texture samples based on a mip map level weight and computing a second number of texture samples that is different than the first number of texture samples, for a first level of detail of a mip mapped texture using the spread, wherein the mip map level weight for a coarse level of detail of the mip mapped texture relative to the first level of detail is a fractional portion of a log base two of a minor axis length and the mip map level weight for a fine level of detail of the mip mapped texture relative to the first level of detail is a difference between one and the fractional portion of the log base two of the minor axis length;
    positioning the second number of texture samples along a major axis of anisotropy according to the spread; and
    filtering the second number of texture samples to produce a filtered texture value for an anisotropic pixel footprint.

13. A computer-implemented method of modifying a number of texture samples for a first level of detail of a mip mapped texture stored in memory that are used to produce an anisotropically filtered texture value for a pixel footprint, comprising:
    computing a spread based on a spread function that specifies a spacing of at least one texel for a first number of texture samples for the first level of detail of the mip mapped texture stored in the memory;
    computing a second number of texture samples that is different than the first number of texture samples, for the first level of detail of the mip mapped texture stored in the memory by dividing a length of a major axis of the pixel footprint by the spread;
    positioning the second number of texture samples along a major axis of anisotropy according to the spread; and
    filtering the second number of texture samples to produce the anisotropically filtered texture value for the pixel footprint.

14. The method of claim 13, further determining a modified spread between each of the second number of texture samples for a fine level of detail of the mip mapped texture without modifying the second number of texture samples by applying a spread modifier.

15. The method of claim 14, wherein the modified spread is one texel, two texels, or a number of texels equal to a square root of the spread.

16. The method of claim 13, wherein the spread function computes the spread for a fine level of detail of the mip mapped texture to equal at least two raised to a power of a product of n and the mip map level weight for a coarse level of detail of the mip mapped texture texels 17. The method of claim 13, wherein the spread function computes the spread for a coarse level of detail of the mip mapped texture to equal at least two raised to a power of a product of n and a mip map level weight for the fine level of detail of the mip mapped texture texels, where n is any real number.

18. The method of claim 13, wherein the spread function increases the spread monotonically for the first level of detail of the mip mapped texture as a mip map level weight decreases.

19. The method of claim 13, further comprising scaling the spread by a parameter to increase or decrease the second number of texture samples for a fine level of detail or a coarse level of detail of the mip mapped texture.

20. The method of claim 13, further comprising determining a modified spread between each of the second number of texture samples for the coarse level of detail of the mip mapped texture without modifying the second number of texture samples by applying a spread modifier.

* * * * *